United States Patent [19]
Liang

[11] Patent Number: 5,947,616
[45] Date of Patent: Sep. 7, 1999

[54] KEY STRUCTURE FOR COMPUTER KEYBOARDS

[76] Inventor: Hui-Hu Liang, No.3, Pao Chi Lane, Chung Ya Tsun, Siu Shui Hsiang, Chang Hua Hsien, Taiwan

[21] Appl. No.: 09/139,029

[22] Filed: Aug. 24, 1998

[51] Int. Cl.$^6$ ................................ B41J 5/08; H01H 13/70
[52] U.S. Cl. .................... 400/491.2; 200/344; 491/495.1
[58] Field of Search ...................................... 400/472, 490, 400/495, 495.1, 496, 491.2, 473, 479, 480, 481, 488, 491, 491.1, 491.3, 492, 682, 691, 692, 693; 248/584, 585; 345/167, 168, 169; 235/1 D, 145 R, 146; 361/680, 683; 341/21, 23; 200/341, 344, 345, 339, 520, 342, 329

[56] References Cited

U.S. PATENT DOCUMENTS

| | | | |
|---|---|---|---|
| 5,278,372 | 1/1994 | Takagi et al. | 200/344 |
| 5,747,758 | 5/1998 | Hochgesang et al. | 200/344 |
| 5,763,842 | 6/1998 | Tsai et al. | 200/344 |
| 5,819,914 | 10/1998 | Yoneyama | 200/344 |
| 5,829,579 | 11/1998 | Tsai | 200/344 |
| 5,842,798 | 12/1998 | Su | 400/472 |
| 5,878,872 | 3/1999 | Tsai | 200/344 |

*Primary Examiner*—Edgar Burr
*Assistant Examiner*—Amanda B. Sandusky
*Attorney, Agent, or Firm*—Bacon & Thomas, PLLC

[57] ABSTRACT

An improved key structure for computer keyboards includes two crossed support frames that, after pivotal connection, have center limiting rods projecting respectively from outer sides of the connecting position. Left and right slide rods respectively project from both sides of a horizontal rod at a bottom end of the two crossed support frames, with an inverted U-shaped groove disposed at a middle section and straddling on the limiting plates of the corresponding key base so that when the crossed support frames are compressed and lie down in a closed state, they will not deviate. Two opposite slide bars that orient inwardly are provided on upper ends of the crossed support frames. Four slide holes are respectively provided on a bottom face of a key unit corresponding to the slide bars so that the slide bars can be positioned in the four slide holes and cause the two crossed frames to lie flat. Furthermore, four L-shaped slide seats are provided on the key base of the base plate corresponding to the left and right slide rods on the two crossed support frames so that the left and right slide rods may just insert into the slide holes to perform left and right displacements. Vertical slide tracks are provided on the key base corresponding to the two center limiting rods of the two crossed support frames so that the center limiting rods are limited by the slide tracks on both sides thereof. An elastic silicon rubber is provided to urge upwardly against the key unit. When the key unit is pressed, upward and downward vertical movement of the key unit is ensured to avoid slanting or deviation. Since the slide rods and slide bars are located in the thickness range of the keyboard base, and the four slide holes will partly go deep into the key base when the key is pressed to its limit, the height between the key and the base plate can be reduced to decrease the overall thickness of the keyboard.

1 Claim, 2 Drawing Sheets

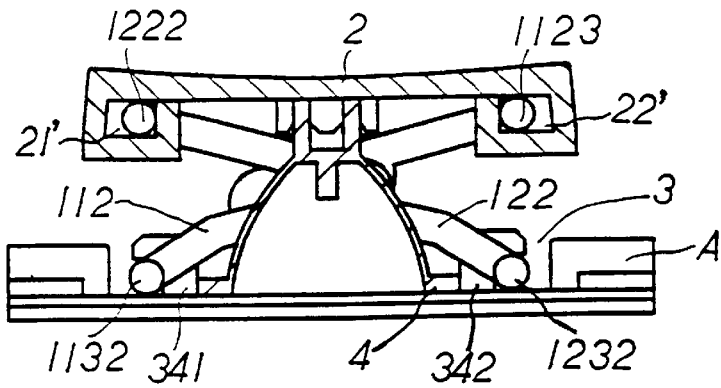
FIG 2
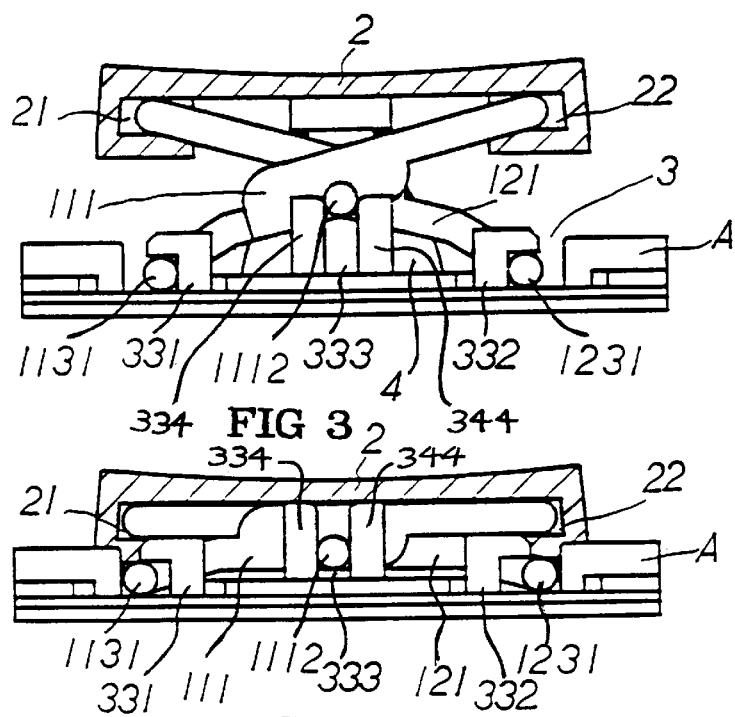
FIG 3
FIG 4
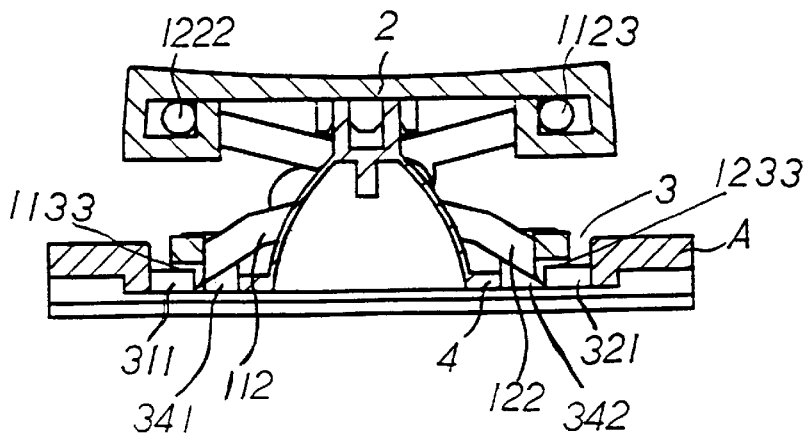
FIG 5

KEY STRUCTURE FOR COMPUTER KEYBOARDS

BACKGROUND OF THE INVENTION (a) Field of the Invention

The present invention relates to an improved key structure for computer keyboards, and more particularly to an improved key structure comprising two crossed support frames pivotally connected, a key unit, and a keyboard base. The support frames have center limiting rods projecting respectively from outer sides of their connecting position. Left and right slide rods respectively project from both sides of a horizontal rod at a bottom end of the two crossed support frames, with an inverted U-shaped groove disposed at a middle section. Two opposite slide bars that orient inwardly are provided on upper ends of the crossed support frames. The key unit has two parallel arrays of slide holes on left and right sides thereof respectively. The keyboard base has a notch of a suitable width at each of left and right sides thereof. A limiting plate extends inwardly on each of the left and right notches. Inverted L-shaped grooves with openings orienting in opposite directions are provided on left and right ends of the front and rear sides. Two vertical rods are respectively provided at a middle section between left and right inverted L-shaped slide grooves, with a vertical slide track formed between the two vertical rods, so that the four bars of the two crossed support frames can be disposed in the four slide holes of the key respectively, and the four slide rods can be disposed in the four inverted L-shaped slide grooves of the key base. At the same time, the left and right inverted U-shaped grooves straddle on the left and right limiting plates, whereas the center limiting rods on both sides are just located on the two vertical slide tracks. When the key is pressed, it compresses an elastic silicon rubber, so that the two crossed support frames utilize the center limiting rods as pivots and drop along the vertical slide tracks, forcing the four slide bars and the four slide rods to displace outwardly in the four slide holes of the key and the four inverted L-shaped slide grooves of the key base, hence the crossed support frames are compressed and lie flat in the key base in an overlapping manner. In this way, the key will not deviate or tilt. Besides, the thickness between the key and the base plate can be reduced.

(b) Description of the Prior Art

With conventional computer keyboards, in order to obtain a suitable height between the keys and the base plate and to ensure smooth operation, improvements have been made on the structure between the keys and the base plate so as to meet the demand of the industry. Crossed links have been used in the industry. However, most of the crossed links have upper and lower ends movably provided at fixed points on one side thereof, and upper and lower ends capable of horizontal sliding displacement on the other side. When a key is pressed, the side capable of horizontal sliding displacement is likely to sink in advance so that it is in a slanting state, thus dragging the center point. This often results in deflection or deviation or slanting, which is inconvenient to the user during operation.

SUMMARY OF THE INVENTION

A primary object of the present invention is to provide an improved key structure for computer keyboards. According to the present invention, the improved key structure comprises two crossed support frames pivotally connected, a key unit, and a keyboard base. The support frames have center limiting rods projecting respectively from outer sides of their connecting position. Left and right slide rods respectively project from both sides of a horizontal rod at a bottom end of the two crossed support frames, with an inverted U-shaped groove disposed at a middle section. Two opposite slide bars that orient inwardly are provided on upper ends of the crossed support frames. The key unit has two parallel arrays of slide holes on left and right sides thereof respectively. The keyboard base has a notch of a suitable width at each of left and right sides thereof. A limiting plate extends inwardly on each of the left and right notches. Inverted L-shaped grooves with openings orienting in opposite directions are provided on left and right ends of the front and rear sides. Two vertical rods are respectively provided at a middle section between left and right inverted L-shaped slide grooves, with a vertical slide track formed between the two vertical rods, so that the four bars of the two crossed support frames can be disposed in the four slide holes of the key respectively, and the four slide rods can be disposed in the four inverted L-shaped slide grooves of the key base. At the same time, the left and right inverted U-shaped grooves straddle on the left and right limiting plates, whereas the center limiting rods on both sides are just located on the two vertical slide tracks. When the key is pressed, it compresses an elastic silicon rubber, so that the two crossed support frames utilize the center limiting rods as pivots and drop along the vertical slide tracks, forcing the four slide bars and the four slide rods to displace outwardly in the four slide holes of the key and the four inverted L-shaped slide grooves of the key base, hence the crossed support frames are compressed and lie flat in the key base in an overlapping manner. In this way, the key will not deviate or tilt. Besides, the thickness between the key and the base plate can be reduced.

BRIEF DESCRIPTION OF THE DRAWINGS

The foregoing and other features and advantages of the present invention will be more clearly understood from the following detailed description and the accompanying drawings, in which.

FIG. 2 is a sectional assembled view of the present invention;

FIG. 3 is a sectional view illustrating the arrangement of the crossed support frame of the present invention;

FIG. 4 is a schematic view illustrating operation of the present invention;

FIG. 5 is a sectional view illustrating the relationship between the limiting plates and the inverted U-shaped grooves.

DETAILED DESCRIPTION OF THE PREFERRED EMBODIMENT

Figure 1:
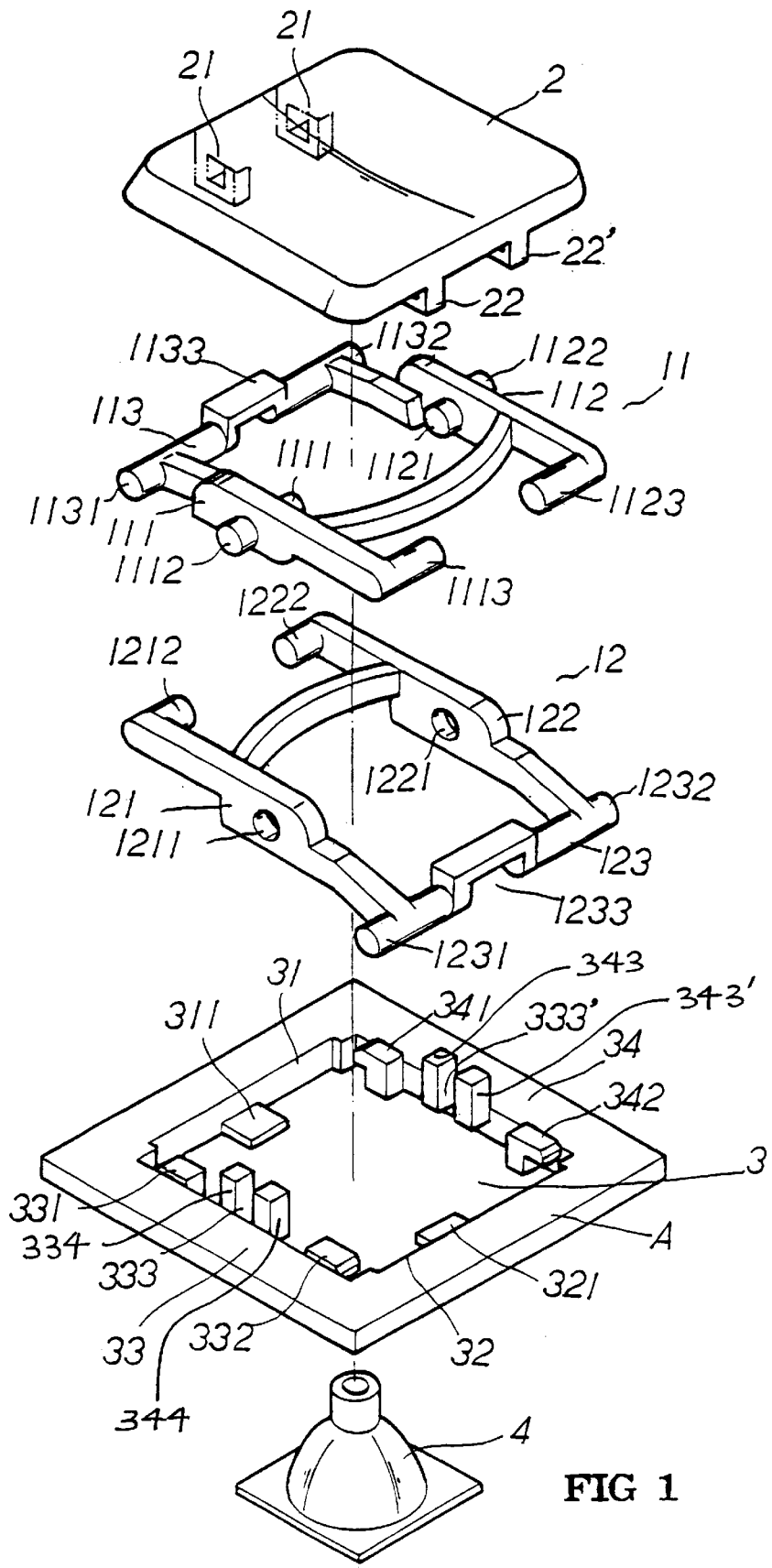
FIG. 1 is a perspective exploded view of the present invention.

With reference to FIG. 1, a crossed support frame 1 includes a left support frame 11 and a right support frame 12. The width of the left support frame 11 is slightly larger than that of the right support frame 12 so that the left support frame 11 can just fit to the outer sides of the right support frame 12 to perform a cutting action. The left support frame 11 has two side plates 111, 112, the middle sections of the inner sides of which are respectively provided with a pivot pin 1111, 1121, whereas the outer sides respectively have a center limiting rod 1112, 1122 projecting therefrom. Referring to FIG. 5, a horizontal rod 113 is connectedly provided at a bottom end of the two sides plates 111, 112, the two sides thereof respectively projecting outwardly to form left and right slide rods 1131, 1132, with an inverted U-shaped groove 1133 disposed in a middle position. Upper ends of the two side plates 111, 112 are respectively provided with inwardly opposite left and right slide bars 1113, 1123. In addition, the two side plates 121, 122 of the left support frame 12 are respectively provided with a pivot hole 1211, 1221 at the middle sections of the inner sides thereof. A horizontal rod 123 is connectedly provided at bottom ends of the two side plates 121, 122. The two ends of the horizontal rod 123 respectively project outwardly to form left and right slide rods 1231 1232, with an inverted U-shaped groove 1233 disposed in a middle section thereof. Upper ends of the side plates 121, 122 are respectively provided with inwardly opposite left and right slide bars 1212, 1222.

A key unit 2 has a bottom side the two sides of which are respectively provided with two parallel units of left and right slide holes 21, (21'), 22 (22') at suitable positions.

A keyboard base 3 has left and right sides respectively provided with left and right notches 31, 32 of a suitable width. The left and right notches 31, 32 have left and right limiting plates 311, 321 respectively extending inwardly thereon. The keyboard base 3 further has front and rear side edges 33, 34. The two ends of the front side edge 33 are respectively provided with inverted L-shaped slide grooves 331, 332 with openings orienting in opposite directions. Likewise, the rear side edge 34 is provided with inverted L-shaped slide grooves 341, 342 with openings orienting in opposite directions. At middle sections between inverted L-shaped slide grooves 331 and 332, and between inverted L-shaped slide grooves 341 and 342 are respectively provided with juxtaposed arrays of front left and right vertical rods 333, 333' and rear left and right vertical rods 343, 343" such that they form front vertical slide tracks 334 and rear vertical slide tracks 344.

Referring to FIGS. 2 and 3, as well as FIG. 1, when the two pivot pins 1121 1111 of the left support frame of the crossed support frame 1 are respectively inserted into the two pivot holes 1211, 1221 of the right support frame 12 and positioned, and when the left and right slide bars 1113, 1123 of the left support frame 11 are placed in the two parallel right slide holes 22, 22' of the key 2, the left and right slide bars 1212, 1222 of the right support frame 12 are respectively placed in the two parallel left slide holes 21, 21' of the key 2, so that the crossed support frame 1 and the key 2 inter-engage, and the four slide bars 1113, 1123, 1212, 1222 displace horizontally in the slide holes 22, 22', 21, 21', respectively. In addition, the left and right slide rods 1131, 1132 of the left support frame 11 are respectively disposed in the inverted L-shaped slide grooves 331, 341 of the front side edge 33 and rear side edge 34 of the keyboard base 3, while the left and right slide rod 1231, 1232 of the right support frame 12 are respectively located in the inverted L-shaped grooves 332, 342 of the front side edge 33 and rear side edge 34 of the keyboard base 3, so that the four slide rods 1131, 1132, 1231, 1232 perform horizontal displacement in the four inverted L-shaped slide grooves 331, 341, 332, 342, respectively. At the same time, the two center limiting rods 1112, 1122 of the crossed support slide frame 1 are just located in the positions of the front and rear vertical slide tracks 333, 333' of the keyboard base 3 to couple the key 2, crossed support frame 1, and keyboard base 3. Furthermore, an elastic silicon rubber 4 is provided to urge upwardly against the key 2 so that when the key 2 is not pressed, the four inverted L-shaped slide grooves 331, 341, 332, 342 will limit the four slide rods 1131, 1132, 1231, 1232 without slippage.

Referring to FIGS. 4 and 5, when the key 2 is pressed, it will press the elastic silicon rubber 4 directly and simultaneously the crossed support frame 1, so that the two center limiting rods 1112, 1122 drops perpendicularly along the two vertical slide tracks 333, 333' of the keyboard base 3 to prevent the centerpoint of the key 2 from displacement and to maintain the elastic silicon rubber 4 in a perpendicular position. Furthermore, the four slide rods 1131, 1132, 1231, 1232 in the four inverted L-shaped slide grooves 331, 341, 332, 342 respectively displace horizontally outwardly, while the four slide bars 1113, 1123, 1212, 1222 in the four slide holes 22, 22', 21, 21' respectively displace horizontally outwardly. At the same time, as shown in FIG. 5, the two inverted U-shaped grooves 1133, 1233 of the crossed support frame 1 are straddled on the left and right side limiting plates 311, 321 of the keyboard base 3. In this way, the crossed support frame 1 will not deviate or tilt, thus achieving stable operation. Furthermore, the four slide rods 1131, 1132, 1231, 1232 are all located in the thickness range of the base plate A, thus reducing the height between the key 2 and the base plate A, making it possible to accomplish a keyboard of a smaller height.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved key structure for computer keyboards, comprising a crossed support frame, a key, keyboard base, and an elastic silicon rubber, said crossed support frame including left and right support frames, said left support frame having a width slightly larger than that of said right support frame so that said left support frame may just fit to the outer side of said right support frame to perform a shearing action, said left support frame having two side plates, the inner sides of which are respectively provided with a pivot pin at a middle section thereof, said right support frame having two side plates, the inner sides of which are respectively provided with a pivot hole at a middle section thereof; said pivot pins of said left support frame being inserted into said pivot holes of said right support frame, said elastic silicon rubber being provided to urge upwardly against said key, whereby when said key is pressed, said elastic silicon rubber is compressed, and when said key is released, said elastic silicon rubber will reset, said key having a bottom face and two parallel arrays of left and right slide holes on both sides of the bottom face at suitable positions, wherein said left support frame having two center limiting rods respectively projecting from outer sides of said two side plates, with a horizontal rod connectedly provided at a bottom end of said two side plates, both sides of said horizontal rod projecting outwardly to form left and right slide rods, with an inverted U-shaped groove disposed in a middle position, upper ends of said two side plates being respectively provided with opposite left and right slide bars that orient inwardly; said right support frame having a horizontal rod connectedly provided at a bottom end of said two side plates, both sides of said horizontal rod of said right support frame respectively projecting outwardly to form left and right slide rods, with an inverted U-shaped groove disposed in a middle position; said four slide bars of said crossed support frame inserting into said left and right slide holes on the bottom face of said key respectively to perform horizontal displacement, said keyboard base having left and right notches of a suitable width on left and right sides thereof, left and right limiting plates extending inwardly on said left and right notches respectively, inverted L-shaped slide grooves having openings orienting in opposite directions being provided on front and rear side edges of said keyboard base respectively, so that said four slide rods and two inverted u-shaped grooves of said crossed support frame fit into said inverted L-shaped grooves and straddle said two limiting plates respectively, and juxtaposed front left and right vertical rods being located at the middle section between said two inverted L-shaped slide grooves of each side edge so that they form two vertical slide tracks, said four slide rods, said two center limiting rods, and said two inverted U-shaped grooves of said crossed support frame being disposed in said four inverted L-shaped slide grooves and said two vertical slide tracks, and straddling on said limiting plates respectively, whereby when said key is pressed, said elastic silicon rubber and said left and right crossed support frames are compressed simultaneously, causing the two center limiting rods to drop along said vertical slide tracks in a perpendicular direction, said four slide rods being restricted by said four inverted L-shaped slide grooves, and said four slide bars being restricted by said four slide holes, as well as positioned by said left and right limiting plates of said keyboard base, thus ensuring smooth pressing of said key and avoiding deviation or slanting.

\* \* \* \* \*